United States Patent [19]

Bennett

[11] 4,385,447
[45] May 31, 1983

[54] GOLF BALL SPHERICITY GAUGE

[76] Inventor: Charles J. Bennett, 5805 Tilbury St., Lakewood, Calif. 90713

[21] Appl. No.: 268,481

[22] Filed: May 29, 1981

[51] Int. Cl.³ .............................................. G01B 3/34
[52] U.S. Cl. ................................... 33/178 B; 33/174 F
[58] Field of Search ............. 33/178 B, 174 Q, 174 F, 33/178 R

[56] References Cited

U.S. PATENT DOCUMENTS

| | | | |
|---|---|---|---|
| 2,475,450 | 7/1949 | Dvorak | 33/178 |
| 2,572,999 | 10/1951 | Elliott | 33/178 |
| 3,310,879 | 5/1967 | Brzezinski et al. | 33/178 |
| 3,512,262 | 5/1970 | Smyk et al. | 33/178 |
| 3,665,757 | 5/1972 | Hoag | 73/94 |
| 3,708,172 | 1/1973 | Rango | 273/164 |
| 3,797,123 | 3/1974 | Fraley | 33/178 |
| 3,828,442 | 8/1974 | Bernard | 33/178 |

FOREIGN PATENT DOCUMENTS 2726588 12/1978 Fed. Rep. of Germany .... 33/174 Q

*Primary Examiner*—Harry N. Haroian
*Attorney, Agent, or Firm*—Fulwider, Patton, Rieber, Lee & Utecht

[57] ABSTRACT

A golf ball sphericity gauge comprising complemental shells defining an interior ball cage having interiorly directed measuring seats lying within the surface defined by a sphere of predetermined sphericity. The shells are separable to permit insertion of a golf ball into the ball cage, and the ball cage includes an aperture enabling manual rotation of a golf ball within the ball cage thereby to detect differences between the sphericity of the golf ball and the predetermined sphericity.

13 Claims, 5 Drawing Figures

GOLF BALL SPHERICITY GAUGE

BACKGROUND OF THE INVENTION

1. Field of the Invention

The present invention relates to a golf ball sphericity gauge adapted to support a golf ball for rotation upon a plurality of interiorly directed measuring seats.

2. Description of the Prior Art

The roundness or sphericity of a golf ball affects the length and path of travel of the ball in flight, and also the directness of path travelled by a rolling ball. Out of round golf balls may occur through poor quality control in manufacturing and also as a result of impact with golf clubs or striking some other solid object.

Various devices have been advanced in the prior art to enable the golfer to check the sphericity of a golf ball. Such devices include a simple ring gauge having an inside diameter approximately the same as the outside diameter of a standard USGA golf ball. The ball must be centered and held within the ring gauge while rotated in order to establish that all cross-sections of the ball are rotatable within the gauge. The accuracy of measurement thus depends to a considerable degree upon the skill of the user.

Another type of prior art device comprises a hemispherical cup within which the ball is received. If there is a lack of sphericity the ball will not seat properly within the cup, improper seating being determined by visual examination of the uniformity of spacing between the ball and the cup. Such a visual test is relatively subjective and therefore imprecise.

SUMMARY OF THE INVENTION

According to the present invention, a golf ball sphericity gauge is provided which comprises a ball cage defined by interiorly directed measuring seats carried by a pair of complemental shells which are easily separable to permit insertion of a golf ball. The seats are precisely arranged to lie within the surface defined by a sphere of predetermined sphericity. An opening in the ball cage enables the user to manually rotate a golf ball within the ball cage. If rotation occurs, the roundness of the golf ball is within certain predetermined, acceptable tolerances.

In a preferred embodiment of the invention the measuring seats comprise three seats on each shell, the seats on the shells being arranged in adjacent relation, respectively, to provide simultaneous, multi-dimensional checks. A relatively slight or partial rotation of the golf ball is enough to indicate that the ball is acceptably spherical. It is not necessary to continually reorient the ball in order to insure that all major cross-sections are the same.

Other objects and features of the invention will become apparent from consideration of the following description taken in connection with the accompanying drawings.

DESCRIPTION OF THE PREFERRED EMBODIMENT

Figure 1:
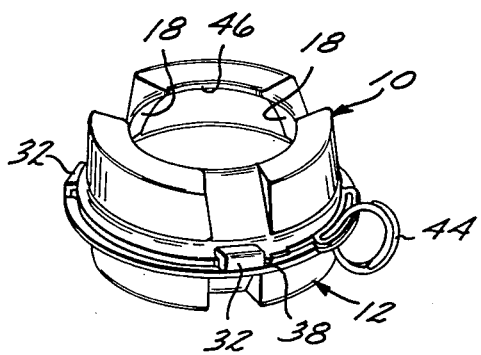
FIG. 1 is a perspective view of a golf ball sphericity gauge according to the present invention.

Referring now to the drawings, there is illustrated a golf ball sphericity gauge according to the present invention comprising, generally, a cup or shell 10 and a cup or shell 12 having complemental surfaces engageable to define an interior ball cage 14 adapted to receive a golf ball 16 to determine the degree of its sphericity.

Shells 10 and 12 are preferably molded of a suitable plastic material having toughness and stability under extremes of temperature and humidity, and capable of withstanding relatively high impact forces. To minimize residual molding stresses, it is preferred to provide a relatively uniform cross-section through any wall portion of the gauge, as will be apparent to those skilled in the art.

The shell 10 includes three interiorly directed measuring seats 18, and the shell 20 similarly includes three interiorly directed measuring seats 20, all of the seats 18 and 20 lying within the surface defined by a sphere 21 of predetermined sphericity. All other interior portions of the shells 10 and 12 are relieved to reduce friction developed during manual rotation of the golf ball 16 within the ball cage 14.

The dimension of the spherical surface within which the measuring seats 18 and 20 lies is 1.690 inches (4.293 centimeters). This dimension provides 0.01 inches (0.025 centimeters) tolerance with respect to the standard USGA minimum ball size of 1.680 inches (4.267 centimeters). Since most golf balls are manufactured with a diameter approximating 1.685 inches (4.280 centimeters) the present sphericity gauge will measure golf balls to within 0.005 inches (0.013 centimeters).

Preferably each measuring seat 18 and 20 is of an area sufficient to extend across more than two of the usual dimples 22 on the ball 16. Consequently, only the maximum diameter of the ball surface outside the dimples 22 is measured. The inner surface of each seat 18 or 20 is complementally curved to closely receive the curved surface of the ball 16.

Figure 5:
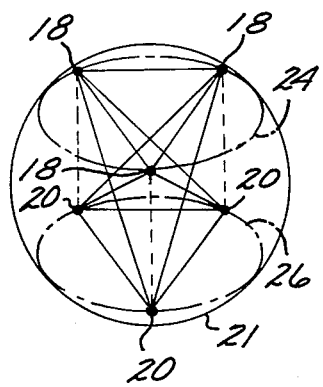
FIG. 5 is a diagrammatic view illustrating the geometric inter-relationship of the measuring seats of the pair of shells constituting the gauge.

In the closed position of the shells 10 and 12, the seats 18 and 20 lie within parallel planes, as diagrammatically indicated by the phantom lines 24 and 26 in FIG. 5. FIG. 5 is a schematic representation of the interior of the ball cage 14, the phantom outline circles denoting the parallel planes 24 and 26 within which lie the seats 18 and 20, respectively. In addition, vertical dotted lines illustrate the preferred alignment of the seats 18 with the seats 20 along mutually parallel axes which are perpendicular to the planes 24 and 26. Lines are drawn between each pair of seats 18 and the opposite, non-aligned seat 20, and similar lines are drawn between each pair of seats 20 and the opposite, non-aligned seat 18. These lines defined six equilateral triangles which all preferably pass through the center of the imaginary sphere 21 within which the seats 18 and 20 lie. The reference planes of the equilateral triangles thus provide a three dimensional spherical check on the roundness of the golf ball 16. Only slight rotation of the ball 16 in a few directions is needed to give an indication of ball sphericity.

Figure 4:
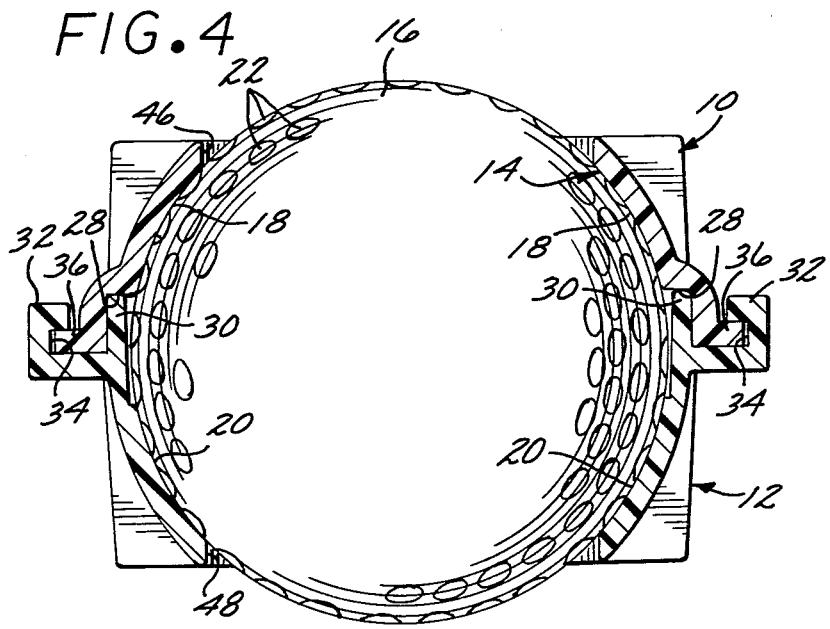
FIG. 4 is an enlarged view taken along the line 4—4 of FIG. 2, and illustrating the location of a golf ball being tested.

Accurate arrangement and alignment of the shells 10 and 12 to form the precisely predetermined configuration of the sphere 21 is established by interengagement of complemental surfaces on the shells. The shell 10 includes a circumferential recess 28 whose base and side wall are engaged by the edge and outer surface of a flange 30 which is integral with the shell 12, as best seen in FIG. 4. Upon location of the flange 30 in the recess 28 the proper axial spacing between the adjacent or confronting seats 18 and 20 is established, and significant relative lateral movement is prevented between the shells 10 and 12.

The shells 10 and 12 are held together by equally circumferentially spaced apart locking means comprising three flange sections or receptacles 32 which are integral with the outer rim of the shell 12 and which define a circumferentially directed recess 34. A pair of tabs or projections 36 and a third tab 36a, all integral with and projecting radially outwardly of the rim of the shell 10, are adapted to circumferentially slidably enter the recesses 34, respectively. The projections 36 and 36a and the recesses 34, are dimensioned to bias or press together the shells 10 and 12 when the projections 36 are received within the recesses 34.

The projection 36a is slightly longer circumferentially than the other projections 36, and is formed to include a radially outwardly projecting finger or stop 38. In the closed position of the shells which brings the projections 36 within the recesses 34, the stop 38 engages the edge of the associated receptacle 32. This limits relative rotation of the shells 10 and 12 beyond the position in which the seats 18 are in aligned, confronting relation to the seats 20, such alignment being indicated in FIG. 5 by the dotted lines, as previously explained.

The adjacent rims of the shells 10 and 12 include enlarged portions having slots 40 and 42, respectively, for receiving a connecting ring 44. The ring 44 provides a convenient means for attaching the gauge to the user's golf bag or the like but, more importantly, it limits the degree of relative circumferential displacement between the shells 10 and 12. The ring 44 prevents the shells 10 and 12 from being fitted together except when the stop 38 is located on that side of the adjacent receptacle 32 enabling entry of the projections 36 and 36a into the recesses 34 on clockwise rotation of the shell 10 relative to the shell 12.

Figure 2:
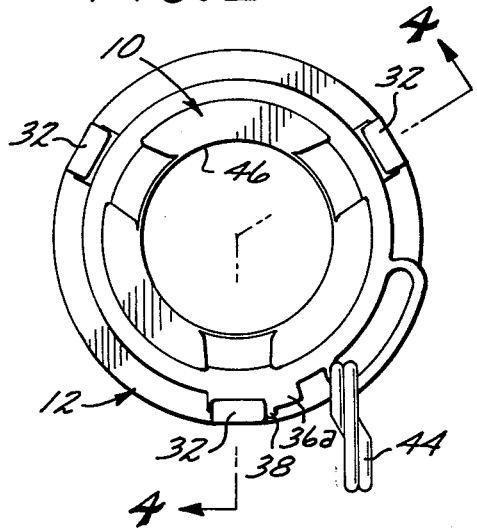
FIG. 2 is a top plan view of the gauge in its closed position.
Figure 3:
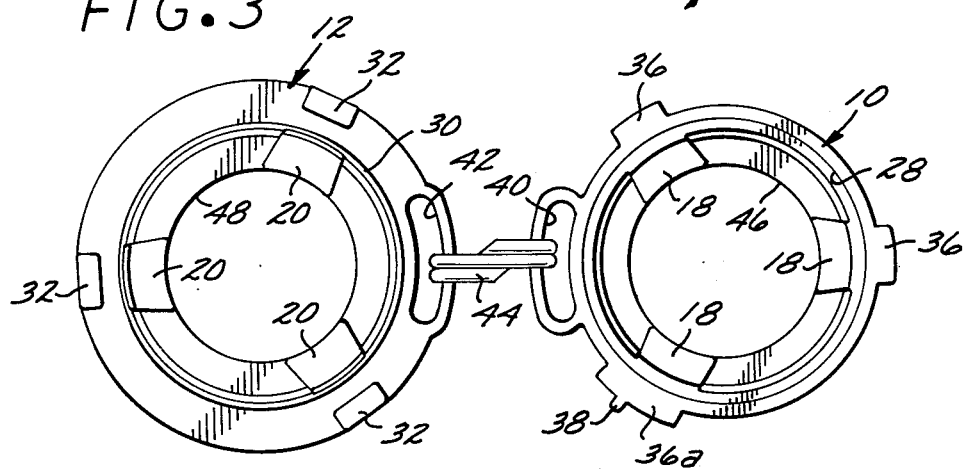
FIG. 3 is a view similar to FIG. 2, but illustrating the gauge in its open position.

In operation, the shells 10 and 12 are separated, a golf ball 16 is placed within either one of the shells, and the shells are brought together into the closed position of FIGS. 1 and 2. The contained ball 16 is manually rotated through circular openings 46 and 48 provided in the shells 10 and 12, respectively, and any significant difference between the sphericity of the golf ball 16 and the predetermined or gauge sphericity 21 is immediately apparent by difficulty or impossibility of ball rotation.

Various modifications and changes may be made with regard to the foregoing detailed description without departing from the spirit of the invention.

I claim:

1. A golf ball sphericity gauge comprising:
a ball cage defined by interiorly directed measuring seats carried by a pair of complemental shells, said shells being separable to permit insertion of a golf ball into said ball cage, said seats defining surface portions of a sphere of predetermined sphericity, said seats being adapted to engage a golf ball in said ball cage and prevent movement of said golf ball out of said ball cage until said shells are separated, said ball cage including an aperture enabling manual rotation of a golf ball within said ball cage thereby to detect differences between the sphericity of the golf ball and said predetermined sphericity.

2. A golf ball sphericity gauge according to claim 1 wherein each of said shells includes a set of three said seats equally circumferentially spaced apart.

3. A golf ball sphericity gauge according to claim 2 wherein one of said sets of said seats is parallel to the other of said sets of seats, and said seats of said sets are, respectively, in axial alignment along axes perpendicular to said planes.

4. A golf ball sphericity gauge according to claim 2 wherein imaginary lines drawn between any two of said seats of one of said shells, and that one of said seats of the other of said shells not axially aligned with either of said two of said seats, defines an equilateral triangle.

5. A golf ball sphericity gauge comprising:
first and second shells having complemental surfaces engageable to define an interior ball cage and including interiorly directed first and second measuring seats, respectively, said seats defining surface portions of a sphere of predetermined sphericity, said shells being separable to permit insertion of a golf ball into said ball cage, said first and second measuring seats being adapted to engage a golf ball in said ball cage and prevent movement of said golf ball out of said ball cage until said shells are separated, said shells including an aperture enabling manual rotation of a golf ball within said ball cage thereby to detect differences between the sphericity of the golf ball and said predetermined sphericity.

6. A golf ball gauge according to claim 5 wherein an annular recess and an annular flange of said first and second shells, respectively, define said complemental surfaces.

7. A golf ball sphericity gauge according to claim 5 and including locking means carried by said shells, said locking means being interengageable to urge said complemental surfaces together.

8. A golf ball sphericity gauge according to claim 7 wherein said locking means comprise a plurality of projections and receptacles on said first and second shells, respectively, said shells being relatively rotatable on said complemental surfaces for locating said projections within said receptacles.

9. A golf ball sphericity gauge according to claim 8 and including stop means for limiting relative rotation of said shells beyond a position in which said first measuring seats are in aligned, confronting relation to said second measuring seats.

10. A golf ball sphericity gauge according to claim 5 wherein there are three equally circumferentially spaced apart first measuring seats and three equally circumferentially spaced apart second measuring seats.

11. A golf ball sphericity gauge according to claim 10 wherein said first and second measuring seats lie within parallel planes, respectively, and are in alignment along axes perpendicular to said planes.

12. A golf ball sphericity gauge according to claim 10 wherein imaginary lines drawn between any two of said first measuring seats, and that one of said second measuring seats not axially aligned with either of said two of said first measuring seats, defines an equilateral triangle.

13. A golf ball gauge according to claim 5 wherein, with respect to a golf ball located in said ball cage, said first and second measuring seats are adapted to engage, respectively, the hemispherical surfaces of the golf ball which lie on opposite sides of said complemental surfaces.

* * * * *